July 5, 1955
C. J. RICE
2,712,467
MANUALLY OPERABLE HOLE DIGGER
Filed July 31, 1950
4 Sheets-Sheet 1
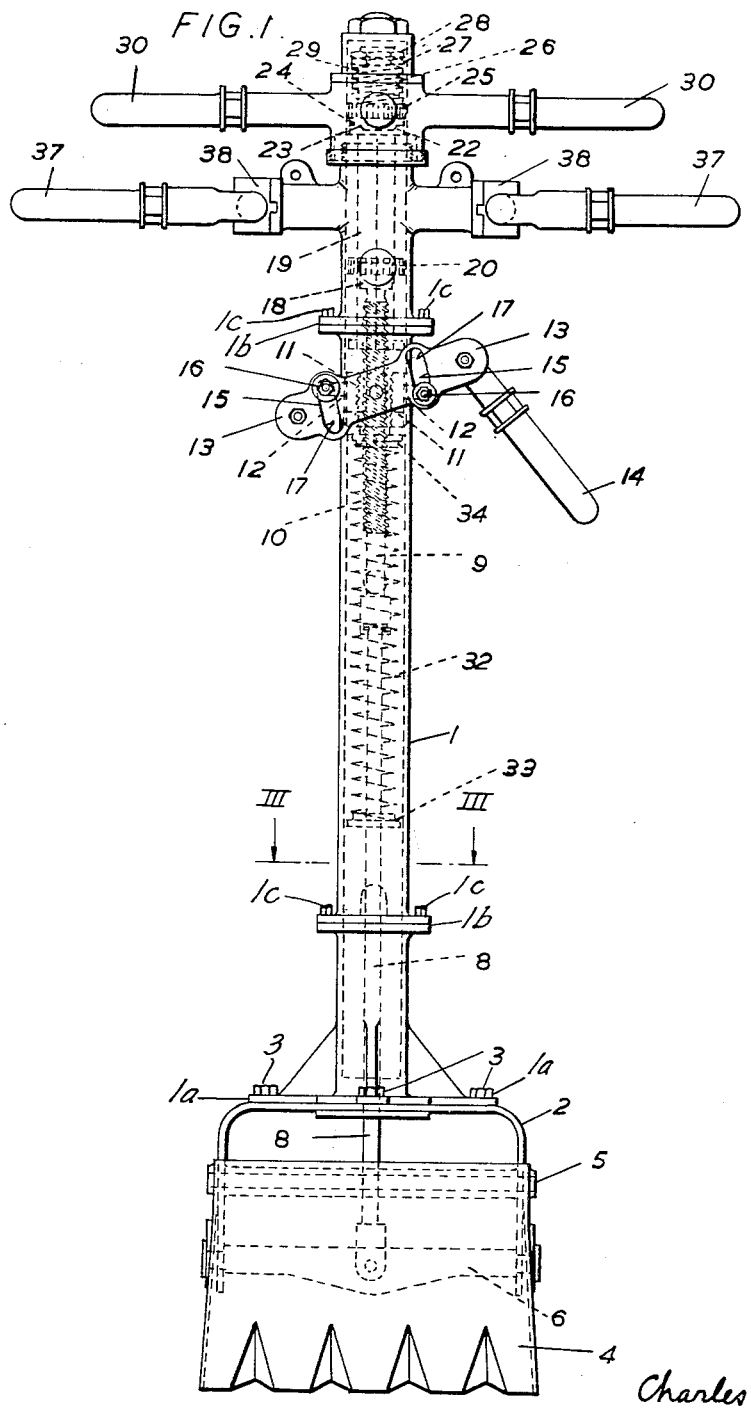
Inventor
Charles J. Rice
By Ralph B. Stewart
Attorney

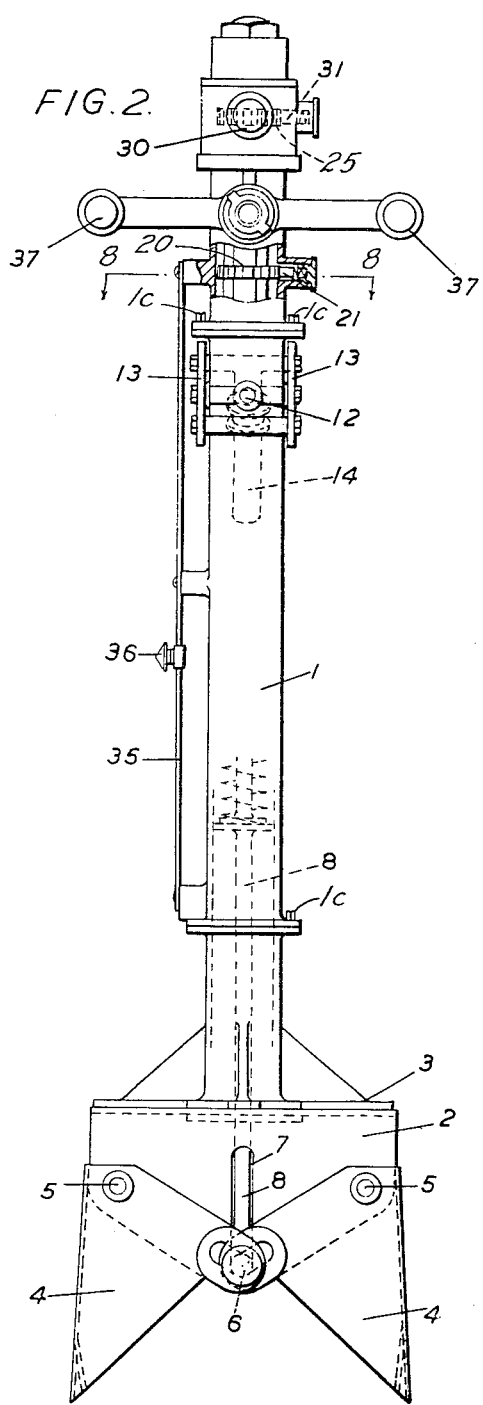

July 5, 1955 C. J. RICE 2,712,467
MANUALLY OPERABLE HOLE DIGGER
Filed July 31, 1950 4 Sheets-Sheet 3
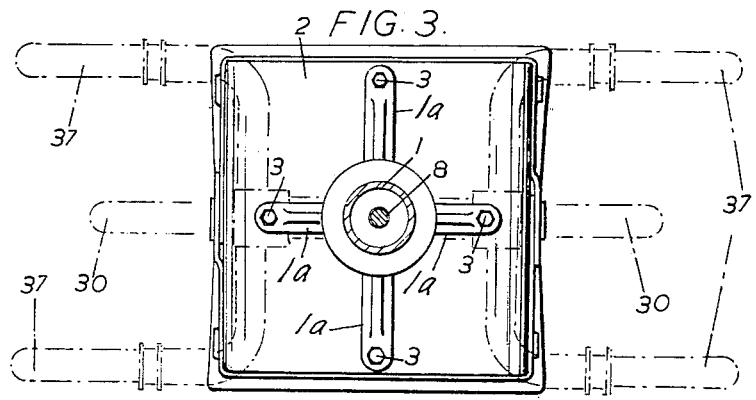
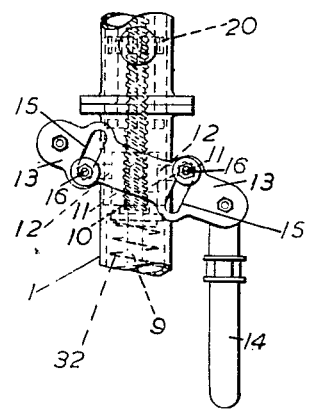
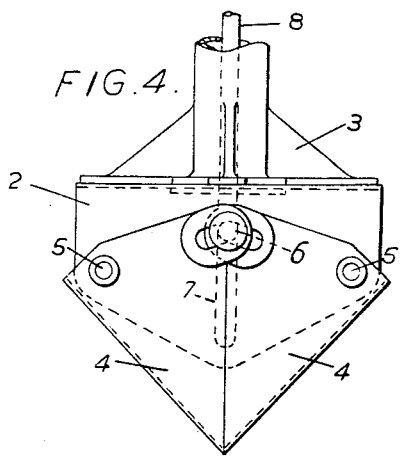
Inventor
Charles J. Rice
By Ralph B. Stewart
Attorney July 5, 1955
C. J. RICE
2,712,467
MANUALLY OPERABLE HOLE DIGGER
Filed July 31, 1950
4 Sheets-Sheet 4
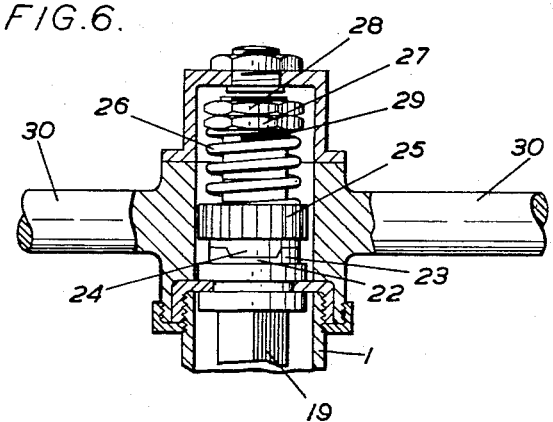
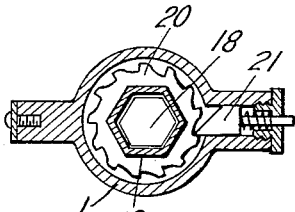
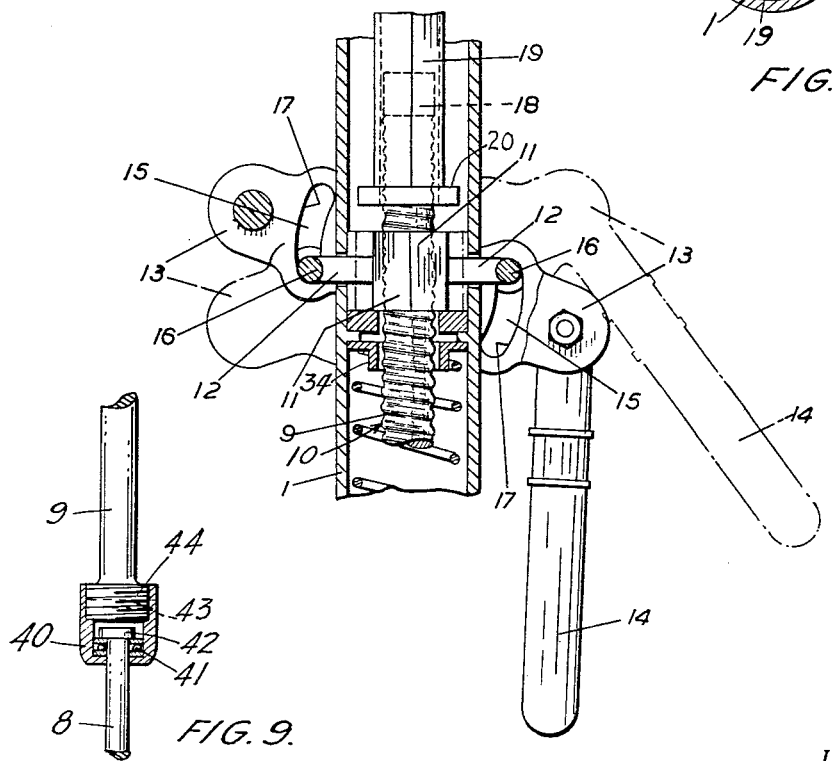
Inventor
Charles J. Rice
By Ralph B. Stewart
Attorney

United States Patent Office 2,712,467
Patented July 5, 1955

2,712,467

MANUALLY OPERABLE HOLE DIGGER

Charles John Rice, Bexleyheath, England

Application July 31, 1950, Serial No. 176,793

Claims priority, application Great Britain August 3, 1949

10 Claims. (Cl. 294—50.8)

This invention is concerned with improvements in or relating to manually operated digging implements, and more particularly, though not necessarily to implements for digging holes of predetermined cross section for receiving posts, trees or the like.

In my Patent No. 2,654,626 there is described and claimed an implement of the above described type which comprises a head portion having two angularly movable blade-like portions adapted to be moved into positions in which they are substantially parallel to one another and into positions in which they are inclined with respect to one another so forming a closed or substantially closed scoop and means operable by a user for urging said bladelike portions into either of the said positions, including means for preventing the inadvertent closing of the blades when the device is in use and further means for positively preventing the opening of the blades when in their closed position.

In preferred embodiments of the device disclosed in my said specification the closing of the bladelike portions was caused either by the vertical movement with respect to the stem of the device of a pair of actuating levers which were attached to a cross bar and thence connected to the bladelike portions or by the continued up and down movement in a vertical plane of one or more pawl carrying arms extending from the stem of the device the pawls of which engaged a ratchet within the stem and lifted said ratchet and a pull rod associated therewith and with the said bladelike portions, each upward stroke of said arms causing a closing movement of the said bladelike portions.

It is an object of the present invention to provide an improved digging implement of the above described type which is of simple construction and which does not necessitate the provision of any exposed apertures in the stem of the device such as are required in the embodiments of my Patent No. 2,654,626 for the reception of said cross bar or said pawls.

According to the present invention therefore there is provided a manually operated digging implement comprising two angularly movable bladelike portions adapted to be moved into positions in which they are substantially parallel to one another and into positions in which they are inclined to one another so as to form a closed or substantially closed scoop and actuating means rotatably mounted about the axis of the implement which serve in operation to move said bladelike portions in a scoop closing direction.

The said implement comprises a generally tubular stem portion having said bladelike portions at one end thereof. Preferably a carrier member for the bladelike portions is mounted either fixedly or detachably at the end of said stem, said bladelike portions being movably mounted in said carrier member. A pull rod or like transmission member is provided in said stem and is operatively associated with the said bladelike portions so that movement of said pull rod in said stem will cause appropriate movements of said blade-like portions.

In order to prevent any tendency of the soil, clay or the like becoming clogged inside the bladelike portions for instance when they are closed and the soil or clay therein is compressed, I may provide ejecting means within said bladelike portions which serve to assist the ejection of any clay, soil or the like therein. Thus I may provide a disc or plate mounted on the end of said pull rod so that when the pull rod moves downwardly and the bladelike portions open said disc or plate will move downwardly within the two bladelike portions thus dislodging and ejecting any clogged matter therein.

The said actuating means which are rotatably mounted about the axis of the stem of the device serve in operation to cause movement of the pull rod or like transmission member so that the bladelike portions will be moved in a scoop closing direction.

The said actuating means may be connected to the said pull rod or the like in any suitable manner and may comprise cooperating threaded portions, a worm or worm wheel, or a pawl and ratchet mechanism, it being understood that in operation that part of the actuating means connected to said pull rod or like transmission member will be rotated about the axis of the stem of the implement.

In a preferred embodiment of the invention I provide a threaded rod or shaft connected to said pull rod, said threaded rod or shaft passing through a split nut in the stem, and a pawl carrying handle rotatably mounted about the axis of the stem, the said pawl serving to engage a ratchet associated with said threaded shaft or rod so that when said split nut is closed and the ratchet is rotated, the threaded shaft and pull rod will move the bladelike portions in a closing direction.

Thus said threaded shaft or rod may have a bolt head, for instance of hexagonal section, thereon and said ratchet may be mounted on a tube of hexagonal section adapted to receive the said bolt head, so that rotation of said ratchet and tube when said split nut is locked will cause the threaded shaft and pull rod to move in the scoop-closing direction.

Spring means are provided which tend always to move said bladelike portions in an opening direction and these may be housed within said hexagonal tube or as is preferred may be disposed around the pull rod so that when said split nut is released the bladelike portions will be urged in an opening direction.

I have found it desirable to provide means for preventing the inadvertent closing of the bladelike portions when the device is being used and whilst there are various ways in which this may be achieved, e. g. by pawl and ratchet devices, I have found that the above mentioned split nut is particularly suitable for this purpose, since when it is closed and in engagement with said threaded shaft or rod, the bladelike portions will be prevented from closing as the implement is urged down into the ground until a positive rotation is applied to the said actuating means.

Since when the implement is being closed there may be a considerable weight of soil or the like within the scoop formed by the bladelike portions it is preferred to provide means for preventing the inadvertent opening of the bladelike portions when they are in their closed position. Such means may be incorporated in the actuating means which may be such that they will only respond to positive operation in an opening or closing direction. I prefer however to provide a spring urged pawl mounted in said stem which serves to engage a ratchet associated with said actuating means so that any back travel of the actuating means is prevented, and thus any inadvertent opening of the bladelike portions is prevented.

Since when a hole is being dug and the bladelike portions are being closed they may grip a large boulder or rock or other non-yielding object which might not be released by the operator with the result that continued movement in a closing direction might result in buckling of the bladelike portions, I prefer to provide a clutch device in said actuating means which is adapted to be freed or caused to slip automatically to disengage the drive of the actuating means when a predetermined resistance to closing of the bladelike portions is exceeded. Thus for instance where a ratchet driving member is provided on a hexagonal tubular member said ratchet member may be mounted rotatably on an extension of said tube, spring means being provided to cause projections, teeth, detents or the like on one surface of said ratchet to engage co-operating projections, teeth, detents or like retaining means or a clutch member on said tube, in order to transmit drive to said tube, threaded shaft and pull rod. When however the resistance to closing of the bladelike portions exceeds a value determined by said spring means the co-operating projections, detents or the like will slip or slide over one another thus preventing damage to the bladelike portions. The said spring means may be adjusted in tension by a suitable adjusting nut.

Where a rotatable pawl carrying handle is provided as part of said actuating means, said handle may extend on one or both sides of said stem, and where the implement is intended for use by one operator alone, quickly connectable locks or catches may be provided which serve to retain said pawl carrying handle in a fixed position where it can serve as the handle by which the implement can be withdrawn from the hole being made, thus dispensing with any other handles.

Where a larger implement is required for operation by two operators, carrying handles may be provided on said stem and preferably said carrying handles and said pawl carrying handle or handles may be so constructed and arranged that they can be folded or packed into an inoperative position so that the whole implement can be brought into a compact condition for purposes of packing or storing. Thus said handles may be either hinged or of telescopic construction.

I may, if desired, provide a depth measuring gauge on the stem of the said implement and if desired also a spirit level in order to ensure that a vertical hole is being dug. If desired also a level carrying quadrant or the like may be adjustably mounted on said stem so that holes may be dug comparatively accurately at angles other than the vertical.

In order that the invention may be well understood a preferred embodiment thereof will now be described in further detail by way of example only and with reference to the accompanying drawings in which:

Figure 1 is a side elevation of the implement in its open position.

Figure 2 is a front elevation of Figure 1.

Figure 3 is a sectional plan on the line III—III of Figure 1.

Figure 4 is a part front elevation in the closed position.

Figure 5 is a detail sectional view of the actuating mechanism when the implement is closed.

Figure 6 is a fragmentary view of the upper end of the stem showing the stem in portions of the operating handle in vertical section.

Figure 7 is a fragmentary view showing the stem in vertical section along the portion which houses the split nut, other parts being shown in elevation.

Figure 8 is a sectional view of Figure 2 taken along the line 8—8; and Figure 9 is a sectional view of a coupling between sections of the pull rod.

A digging implement according to the invention has a tubular metal stem 1 of any desired length having a U-shaped carrier member 2 detachably secured to its lower end by screws 3 passing through flanged arms 1a (Figure 3) at the lower end of stem 1, so that the same stem assembly may if desired be used with carrier members of different sizes. Two bladelike portions 4 which are generally triangular in side elevation and rectangular in front elevation are pivotally mounted on shafts 5 which extend between the arms of said U-shaped carrier 2. A cross bar 6 which is vertically slidable in slots 7 in opposite arms of the U-shaped carrier connects the two bladelike portions 4 together so that upon vertical movement of the cross bar 6 the bladelike portions 4 can be moved between a position where they are substantially parallel to one another and a position where they are inclined to one another to form a substantially closed scoop.

A pull rod 8 is attached to said cross bar 6 and extends upwardly into said stem 1. The end of said pull rod 8 remote from the cross bar 6 is connected to a shaft or rod 9 having preferably a three start thread 10 thereon. The connection between rods 8 and 9 permits rotation of the rod 9 with respect to the rod 8, but holds the two rods against relative axial displacement. This connection is shown in Figure 9 and comprises a cup member 40 threadedly engaging a threaded enlargement 44 on the end of rod 9 and housing a thrust race 41 in its lower portion which supports a flange 42 on rod 8. When the parts 8, 9, 40, 41 and 42 are assembled, a pin 43 is inserted through cup 40 and the said enlargement 44 to prevent disconnection of the parts during operation of the implement.

Inside the said stem 1 a split nut 11 is provided which is adapted in its closed position to engage said threaded shaft or rod 9. The split nut 11 is supported in the stem 1 against axial movement along the stem. A pin 12 extends from each half of said nut 11 through the wall of said stem 1 and makes connection with opposite ends of a bridle 13 which is pivotally mounted with respect to the stem 1. The bridle 13 has a hand grip 14 attached thereto so that by movement of the bridle 13 the split nut can be opened or closed as required. The bridle 13 has slots 15 therein which receive rods 16 which are connected to the respective halves of the split nut 11. It will be noted that at their extremities the said slots are slightly curved at 17 so as to serve as a lock against accidental opening of the split nut 11 when the device is in use.

The end of said shaft or rod 9 remote from the pull rod 8 has a hexagon bolt head 18 thereon, which is adapted to fit into a tubular actuating member 19 of hexagonal cross section. At the lower end of said hexagonal tube 19 a toothed ratchet 20 is provided which is engaged by a spring urged pawl 21 mounted on the inside of said stem, said pawl and ratchet serving to prevent any back travel of the actuating member when the bladelike portions are being closed. At the upper end of said hexagon tube 19 a clutch disc 22 having a plurality of projections 23 on its upper surface is provided and serves to engage corresponding projections 24 on the lower surface of a second ratchet member 25 which is rotatably mounted on an extension 29 of said hexagonal tube 19 above said clutch disc 22. A coil spring 26 and an adjusting nut 27 and lock nut 28 are provided on the end of said extension and serve to enable the pressure between the co-operating projections on the clutch disc 22 and ratchet 25 to be adjusted, so that when the bladelike portions 4 during their closing movement engage an immovable obstacle, the projections 23 and 24 will slide over one another upon continued movement of the bladelike portions 4 as soon as the tension in said coil spring 26 is overcome.

At the top of said stem 1 a pawl carrying actuating handle 30 is provided which is rotatable about the axis of the stem 1. This handle extends on both sides of the stem and both ends of the handle are removable so that in operation a suitable leverage will be obtained with the handle in extended position whilst for storage and transport the handle can be readily packed. A spring urged pawl 31 is mounted on one of said handles 30 and is adapted to engage the said second ratchet member 25. A compression spring 32 which as will be described serves to return the bladelike portions to their open or parallel position is disposed around the pull rod 8 inside the stem 1. One end of this spring is carried by a flanged disc 33 mounted on the pull rod, whilst the other end is carried by a flanged bush 34 disposed in the stem 1 through which bush 34 the rod 9 passes freely.

Extending down the stem 1 is a graduated depth gauge 35 having an adjustably mounted indicator 36 thereon. At the upper end of the stem, two U-shaped handles 37 are mounted which serve to enable two operators to lift the implement when the scoop is filled. It will be understood that such handles are preferably only provided where the size of the implement is too large for operation by one man, since in small implements means may be provided for locking the pawl carrying handles with respect to the stem so that they serve as handles to enable the implement to be withdrawn from a hole by one man.

The implement described above is operated as follows. When a hole is to be dug, the bridle 13 on the stem is moved to the position where the split nut 11 is closed and engages the threaded shaft 9 in the stem 1. The bladelike portions 4 can then be pressed or driven by foot pressure down into the ground and the threaded engagement of split nut 11 with threaded shaft 9 together with the engagement of hexagon bolthead 18 in the hexagonal tube 19 is sufficient to prevent the bladelike portions 4 from inadvertently closing as the implement is driven into the ground.

When the bladelike portions 4 have been driven into the ground the said pawl carrying handle 30 is rotated so that the pawl 31 engages the said second ratchet 25 which causes the hexagonal tube 19 to rotate, whereupon since the hexagon bolt head 18 is inside the hexagonal tube 19 and the threaded shaft 9 is engaged by the said split nut 11, the said threaded shaft 9 rises with respect to the stem 1 and pulls the rod 8 upwards thus causing the bladelike portions 4 to move into their scoop forming position. If during the closing movement the edges of the blade portions engage a rock or other immovable object continued rotation of the pawl carrying handles will merely cause the clutch disc 22 and ratchet 25 to slip out of engagement thus avoiding damage to the blade portions.

During the closing of the blade portions the rising flanged disc 33 on pull rod 8 compresses the said spring 32 so that when a scoop full of soil is withdrawn from the hole and the bridle 13 is moved so as to open the split nut 11, the weight of earth in the scoop together with the compressed spring 32 serve to open the blade portions 4 at once so as to deposit their load. The said ratchet 20 at the lower end of said hexagonal tube 19 serves with the pawl 21 mounted inside said stem to prevent any back travel of the hexagonal tube during the closing movement of the bladelike portions.

It will be seen from the above description that a manually operated digging implement has been provided which is comparatively simple in construction, and simple and rapid in operation. The working parts of the implement are enclosed in the stem of the implement which has no exposed apertures, so that there is little possibility of earth or clay clogging the operating parts. As shown in Figure 1, the stem 1 is formed of two or more linear sections secured together by flanged couplings 1b, thereby making it possible to insert extension sections in the stem and pull rod to adapt the implement for the digging of holes of different depths, flanges 1b are detachably secured together by suitable bolts 1c.

It will be understood that I have only described one preferred embodiment by way of example of an implement according to the invention and that modifications and variations may be made therein without departing from the scope thereof. For instance bladelike portions of any desired shape other than those described above may be employed and alternative means may be provided for mounting said blade portions on said stem. Furthermore, various mechanical equivalents to the actuating means and locking means described above may be employed within the scope of this invention.

What I claim is:

1. A manually operated digging implement comprising a tubular stem, two angularly movable blade-like portions mounted at one end portion of said stem and adapted to be moved into positions in which they are substantially parallel to one another and into positions in which they are inclined to one another so as to form a closed scoop, a pull rod extending along the stem and operatively connected at one end to said blade-like portions, a threaded shaft connected to the other end of said pull rod, a split nut fixedly mounted in said stem so as to engage said threaded shaft when closed, means for opening and closing said split nut, a head portion on said threaded shaft, a tube rotatably mounted in said stem and surrounding the headed end portion of said threaded shaft, the cross section of said tube and head portion being non-circular to permit only relative axial movement between said portion and tube, a ratchet carried by said tube, an actuating handle mounted on said stem remote from said bladelike portions and rotatable about the axis of the stem, and a pawl carried by said handle and engaging said ratchet, said pawl serving upon closing of said split nut, and upon rotation of said handle, to drive said ratchet and effect movement of said bladelike portions in a scoop closing direction.

2. A digging implement according to claim 1 and including means connected with one of the scoop-actuating parts for preventing back travel during a scoop-closing operation.

3. A digging implement according to claim 1 and including a further pawl and ratchet serving to allow rotary movement of said threaded shaft and said tube only in a scoop-closing direction.

4. A digging implement according to claim 1 and including a spring disposed around said pull rod within said stem and acting on said pull rod in a direction tending always to urge said blade-like portions in an opening direction, and a further pawl and ratchet serving to allow rotary movement of said threaded shaft and said tube only in a scoop-closing direction.

5. An implement as claimed in claim 1 in which means are provided for preventing continued closing movement of the blade-like portions when non-yielding objects such as a rock or boulder are engaged between them.

6. An implement as claimed in claim 1 and including a slipping clutch associated with said actuating means for preventing continued closing movement of the bladelike portions when non-yielding objects such as a rock or boulder are engaged between them.

7. A manually operated digging implement as claimed in claim 1 and including a further pawl carried by said tube and a ratchet mounted on said stem and cooperating with said further pawl for preventing rotary movement of said threaded shaft in a scoop-opening direction, and a slipping clutch associated with said actuating handle for preventing continued closing movement of the bladelike portions when non-yielding objects such as a rock or boulder are engaged between them, one portion of said slipping clutch being carried by the first-mentioned ratchet.

8. An implement as claimed in claim 1 in which said blade-like portions are mounted in a carrier member detachably mounted on the stem so as to enable blade-like portions of varying sizes to be readily fitted.

9. An implement as claimed in claim 1 in which said stem is flanged so as to enable extension portions of said stem and pull rod to be fitted in accordance with the depth of hole to be dug.

10. A manually operated digging implement comprising a tubular stem, a carrier member detachably mounted on one end of the stem, two angularly movable blade-like portions pivotally attached to the carrier member and adapted to be moved into positions in which they are substantially parallel to one another and into positions in which they are inclined to one another so as to form a closed scoop, a pull rod extending along the stem and operatively connected at one end to said blade-like portions, actuating means including a threaded shaft connected to the other end of said pull rod and adapted to be engaged by a split nut, which nut is mounted in fixed position within said stem, means for opening and closing said split nut, said shaft extending into said stem and being mounted therein to be rotatable about the axis of said stem, a rotary tube of a non-circular cross-section having a ratchet mounted thereon arranged within said stem, said threaded shaft having a head of similar cross-section disposed in said tube and being adapted to be rotated by said tube, an actuating handle rotatably mounted on said implement and carrying a pawl engaging said ratchet, a spring disposed around said pull rod within said stem and tending always to urge said blade-like portions in an opening direction, a further pawl and ratchet connected between said tube and said stem and serving to allow rotary movement of said threaded shaft and said tube only in a scoop-closing direction, a slipping clutch associated with said actuating handle, one portion of said slipping clutch being carried by the first-mentioned ratchet, and carrier handles extending on each side of said implement.

References Cited in the file of this patent

UNITED STATES PATENTS

| | | |
|---|---|---|
| 394,322 | Atkinson | Dec. 11, 1888 |
| 521,208 | Day et al. | June 12, 1894 |
| 734,774 | Szafka | July 28, 1903 |
| 911,814 | Ertel | Feb. 9, 1909 |
| 951,945 | Feix | Mar. 15, 1910 |
| 1,090,578 | Smythe | Mar. 17, 1914 |
| 1,443,138 | Littley | Jan. 23, 1923 |
| 1,443,593 | Ripsch et al. | Jan. 30, 1923 |
| 2,028,680 | Mayeda et al. | Jan. 21, 1936 |
| 2,160,696 | Fabbro | May 30, 1939 |